Nov. 6, 1923.
R. B. HOLLENBECK ET AL
1,473,098
UPHOLSTERY SECURING DEVICE
Filed Jan. 12, 1921
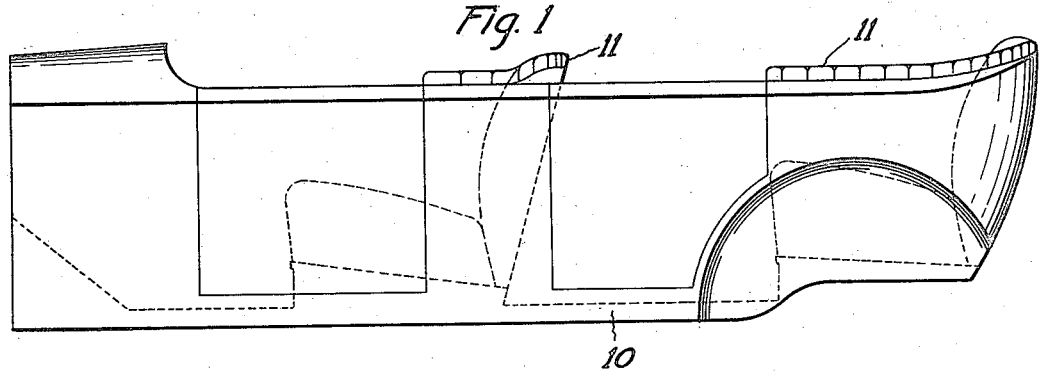
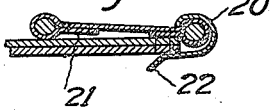
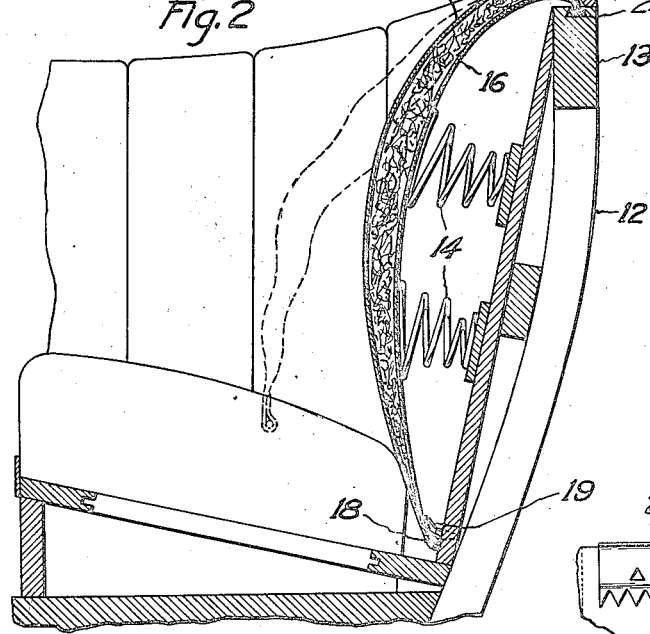
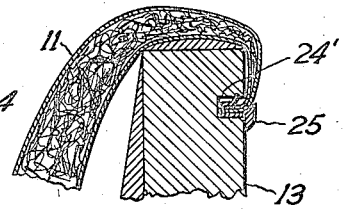
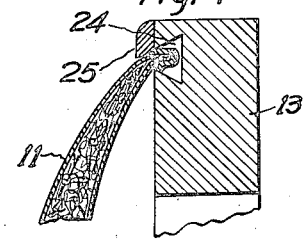
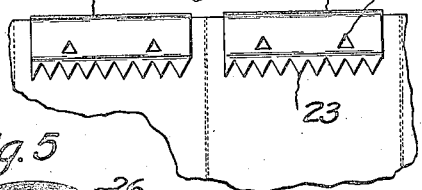
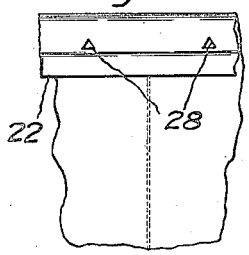
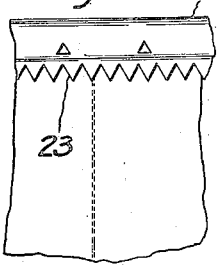
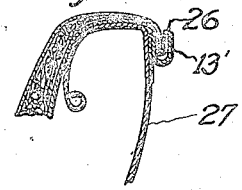
Inventor
Royal B. Hollenbeck &
Harold Roe
By Attorneys Patented Nov. 6, 1923.

1,473,098

UNITED STATES PATENT OFFICE.

ROYAL B. HOLLENBECK AND HAROLD ROE, OF FLINT, MICHIGAN.

UPHOLSTERY SECURING DEVICE.

Application filed January 12, 1921. Serial No. 436,784.

*To all whom it may concern:*

Be it known that we, ROYAL B. HOLLENBECK and HAROLD ROE, citizens of the United States, and residents of Flint, county of Genesee, and State of Michigan, have invented certain new and useful Improvements in Upholstery Securing Devices, of which the following is a full, clear, concise, and exact description, such as will enable others skilled in the art to which the invention relates to make and use the same, reference being made therein to the accompanying drawings, which form a part of this specification.

The invention relates to means adapted to secure to a relatively rigid structure the edge of a body of flexible material such as fabric or the like, and while not limited thereto it is of especial utility in connection with the attachment of upholstery materials to the frames of seats or other upholstered articles. The object of the invention is primarily to provide a securing means which may be cheaply manufactured and easily attached to the edge of the fabric material, and whereby the said material may be easily and quickly secured to a frame or the like.

A further object is to provide an upholstery attaching device which may be assembled with the upholstery as a step in the manufacture of the same, and whereby the upholstery may then be applied to seats, vehicle bodies or the like, whether of metal or wood, at a slight expenditure of time and effort and without requiring special skill on the part of the workmen. With these and other objects in view as will appear more fully from the following description our invention comprises the features of novelty hereinafter described and set forth in the claims hereto appended.

Referring to the accompanying drawings:

Fig. 1 is a side elevation of an automobile body in connection with the upholstery of which our invention may be employed;

Fig. 2 is a sectional elevation showing the back of a vehicle seat in which our invention may be embodied;

Figs. 3, 4 and 5 are fragmentary sections illustrating various methods of applying our invention to the securing of upholstery or like material;

Figs. 6, 7 and 8 are fragmentary views showing different forms of clips applied to fabric material; and Fig. 9 is an enlarged detail in section showing a clip employed in connection with a binding for the edge of fabric material.

In the drawings, 10 designates a vehicle body of the type commonly employed for passenger automobiles, the seats of said body being equipped with the usual upholstery 11, which may be of leather or other flexible material ordinarily used for this purpose. It is customary in the vehicle seats of this type to provide a frame structure indicated at 12 and having top members or rails 13.

A cushion or spring structure 14 may be supported in any convenient or usual manner upon the frame structure 12. The upholstery 11 which usually comprises an outer cover or facing 15 of leather or other similar material, a backing 16 of burlap or the like, and a filling material or padding 17, is stretched over the spring structure and secured at its edges to the frame structure of the seat or body. The means for securing the upholstery at the lower edge may be of various forms, but preferably of such character that the upholstery may be readily and quickly secured in position thereby.

In the form illustrated in the drawings we have shown the upholstery as provided at its lower edge with a rod 18, which may be sewed or otherwise secured within a fold of the material. Suitable holding means may be arranged upon the frame structure, such as screws 19 the heads of which serve to retain the rod 18. Various other devices may be employed to provide a notch, shoulder or like means whereby the rod 18 may be engaged and held against upward movement by reason of the tension of the stretched material.

The securing means for the upper edge of the upholstery, with which our invention is more directly concerned, comprises a clip 20, preferably of sheet metal, formed to engage over and be firmly clamped to the edge of the upholstery or other fabric material to be secured. A binding 21 affording a finish for the edge of the upholstery or fabric, and which may be sewed or otherwise attached to the material, may also be clamped under the clip and thereby secured to the edge of the material or serve as an additional retaining means to prevent separation of the clip from the material. If desired the clip may be provided also with indentations or points as indicated at 28, which may be formed by suitable punching devices associated with the clip attaching means. Such indented portions, preferably pointed toward the edge of the fabric or the like, will, as is obvious, tend to prevent the escape of the material from the clip. One edge at least of the clip is preferably bent up so as to extend outwardly from the face of the fabric or like flexible material and form an engaging or retaining flange 22. This flange may be serrated as shown at 23 in Figs. 6 and 7, thereby forming teeth which are adapted to grip wooden or other yielding surfaces.

The frame or rail 13 or other supporting structure is provided with a recess, shown as a groove or slot formed in the frame.

It will be understood that the recess may be constituted in other ways than as shown and we regard our invention as comprehending the use of any form of recess into which the clip or clips may be inserted and with the wall or walls of which they may engage to prevent withdrawal.

Such groove is shown at 24 in Figs. 2 and 4, as being under-cut or of dove-tailed formation to provide an over-hang or shoulder, but it may also be of rectangular cross section as shown at 24' in Fig. 3 or of various other formations that may be considered desirable. The edge of the fabric with the clip in position thereon may be inserted into such grooves by forcing it inwardly from the face of the frame or other supporting structure or it may in some cases be inserted end-wise into the grooves. In either case the outwardly extending flange 22 or teeth 23 will be forced into engagement with the sides of the groove by reason of the natural resilience of the sheet metal of which they are constructed. Any tension applied to the fabric material tending to cause its withdrawal from the groove, will, as is obvious, increase the firmness of contact between the clip and the walls of the groove, thereby preventing the detachment of the fabric under all ordinary conditions.

A band or finishing strip 25 may be applied, if desired, especially when the binding 21 is not employed, to conceal the edge of the groove and the clip which is seated therein. The groove may be placed in any convenient or desired location with reference to the supporting structure. It is shown in Fig. 4 as being located upon the front or face of the frame or rail 13, while in Fig. 2 it is shown as formed in the top edge, and in Fig. 3 in the rear face of the said rail.

The length of the clip will be varied as circumstances may require. If the groove in which the material is to be secured is rectilinear and of considerable length the clip may be formed of a continuous strip of a length corresponding to that of the groove. Where, however, the groove is irregular or curved a continuous clip may be inconvenient to apply and in such cases we deem it preferable to form the clip in short sections as shown at 20', Fig. 6. The length of each section may vary, of course, with the circumstances, and may in some cases be of the width of a single tooth of the serrated flange.

These sections may be placed at suitable intervals along the edge of the material to be secured, which intervals may be those at which tacks or like securing devices would ordinarily be applied. Where our device is used in connection with a frame of sheet metal or other metallic construction the securing groove may be formed in or constituted by the suitably shaped edge of the metal frame or body, or the groove may be formed in a separate strip of sheet metal suitably bent as shown at 13', Fig. 5, and attached in any convenient manner to the frame or supporting structure 27. In such cases the metal strip may be bent over along its edge as at 26 to form thereby an interior shoulder against which the outwardly extending flange of the clip may be seated. With this construction or wherever the groove or recess is formed with an internal shoulder or the like, the flange 22 of the clip need not be serrated but may be left with a straight edge as shown in Fig. 8.

Where the presence of a shoulder or constriction in the groove or recess is relied upon to retain the clip it will be obvious that the resiliency of the clip is not essential particularly where the material constituting the recess may in itself be resilient or where the shoulder or constriction may be constituted by a removable or insertable strip or locking member.

It will be understood that various other changes and modifications in details of construction may be made in addition to those shown and described without departing from the spirit and scope of the invention, and therefore we do not wish to be limited to the specific construction herein shown.

While we have illustrated our invention, and have found it particularly useful, in connection with the attachment of upholstery to vehicle seats, it will be seen that the construction is generally applicable to all constructions where it is necessary to secure an edge or flap of relatively thin or flexible material to a surrounding or supporting structure.

In the manufacture of automobile bodies the invention is of especial utility inasmuch as it enables the upholstery material to be manufactured and assembled in a plant where this operation alone is carried on, the clip or clips being formed up previously or simultaneously with the application thereof to the upholstery and being clamped upon the edge of the said upholstery either by hand tools or by suitably designed attaching machines. The already formed upholstery may then be transported to a vehicle body plant and assembled upon the bodies at a suitable stage in the manufacture of the same. The edges upon which the clips have been affixed will be first placed in position in the groove provided for that purpose. The upholstery material, which will then hang loosely, as shown in dotted lines in Fig. 2, may then be engaged either by hand or by suitable tools designed for that purpose and forced downwardly, being thereby stretched to the extent considered desirable, and the lower edge secured in position preferably by some such readily attachable and detachable connection as is illustrated in the drawings. By this method it will be seen that the time required for placing upholstery upon the bodies as well as the degree of skill required is much less than where the upholstery is tacked or otherwise secured to the frame at one point at a time as is at present commonly done, and as a result, the process of manufacture will be correspondingly expedited.

We claim:

1. Securing means comprising a sheet metal clip adapted to be clamped over an edge of a flexible material and provided with an outwardly extending edge portion adapted to engage within a recess or groove in a structure to which the said material is to be attached.

2. Securing means comprising a clip adapted to be affixed to the edge of a flexible material and provided with an outwardly extending resilient flange the edge of which is adapted to be engaged and retained by the walls of a groove.

3. Securing means comprising a sheet metal clip adapted to be affixed to an edge of flexible material and provided with an outwardly extending resilient flange having a toothed portion and adapted to engage with a wall of a groove in a supporting structure.

4. The combination with a body of flexible material of securing means comprising a recessed member, the outer portion of said recess being constricted, and a clip affixed to an edge of said material and provided with a flange engaging within the recess of said member, said clip being prevented from withdrawal from said recess by engagement with said constriction.

5. The combination with a body of flexible material of securing means comprising a grooved member and a clip affixed to an edge of said material and adapted to lie within said groove, said clip having an outwardly extending flange the edge of which is adapted to engage the wall of said groove.

6. The combination with a body of flexible material of securing means comprising a grooved member and a series of clips clamped over the edge of said material, said clips lying within said groove and provided with outwardly extending gripping projections engaging with the interior surfaces of said groove.

7. The combination with a sheet of material of a retaining clip comprising a piece of sheet metal bent to channel form and secured to the said sheet with the latter lying in the said channel, one edge of the piece being bent outwardly from the plane of the sheet to form a gripping means adapted to engage within a groove in a frame member.

8. The combination with a frame member having a groove therein of a sheet of material positioned with its edge in said groove, and a series of clips secured to the edge of said sheet and having projections engaging the wall of the groove to retain the sheet therein.

9. The combination with a frame member having an undercut groove therein of a sheet of material adapted to be secured to said member and securing means comprising sheet metal clips, each clip having a portion bent outwardly to form a flange the edge of which engages with the wall of said groove to prevent separation of said sheet and said member.

In testimony whereof we affix our signatures.

ROYAL B. HOLLENBECK.
HAROLD ROE.